(12) United States Patent
Zaremba et al.

(10) Patent No.: US 12,486,400 B2
(45) Date of Patent: Dec. 2, 2025

(54) REMOVABLE MOISTURE BARRIER

(71) Applicant: American Sealants, Inc., Fort Wayne, IN (US)

(72) Inventors: Andrew Zaremba, Roanoke, IN (US); Whitney Bolt, Fort Wayne, IN (US); Robert K. Ddamulira, Chattanooga, TN (US)

(73) Assignee: American Sealants, Inc., Fort Wayne, IN (US)

( * ) Notice: Subject to any disclaimer, the term of this patent is extended or adjusted under 35 U.S.C. 154(b) by 160 days.

(21) Appl. No.: 18/523,011

(22) Filed: Nov. 29, 2023

(65) Prior Publication Data
US 2024/0182716 A1    Jun. 6, 2024

Related U.S. Application Data

(60) Provisional application No. 63/385,802, filed on Dec. 2, 2022.

(51) Int. Cl.
| | | |
|---|---|---|
| *C08L 83/04* | (2006.01) | |
| *B29C 41/00* | (2006.01) | |
| *B29C 41/42* | (2006.01) | |
| *B29C 41/50* | (2006.01) | |
| *C08J 5/18* | (2006.01) | |
| *C08K 13/06* | (2006.01) | |
| *B29C 41/12* | (2006.01) | |
| *B29K 71/00* | (2006.01) | |
| *B29K 83/00* | (2006.01) | |
| *B29K 105/00* | (2006.01) | |
| *C08K 3/26* | (2006.01) | |
| *C08K 3/36* | (2006.01) | |
| *C08K 5/12* | (2006.01) | |
| *C08K 5/20* | (2006.01) | |
| *C08K 9/02* | (2006.01) | |

(52) U.S. Cl.
CPC .......... *C08L 83/04* (2013.01); *B29C 41/003* (2013.01); *B29C 41/42* (2013.01); *B29C 41/50* (2013.01); *C08J 5/18* (2013.01); *C08K 13/06* (2013.01); *B29C 41/12* (2013.01); *B29K 2071/00* (2013.01); *B29K 2083/00* (2013.01); *B29K 2105/0032* (2013.01); *B29K 2105/0038* (2013.01); *B29K 2105/0044* (2013.01); *C08J 2383/04* (2013.01); *C08J 2471/02* (2013.01); *C08K 2003/265* (2013.01); *C08K 3/36* (2013.01); *C08K 5/12* (2013.01); *C08K 5/20* (2013.01); *C08K 9/02* (2013.01); *C08K 2201/005* (2013.01); *C08K 2201/011* (2013.01); *C08K 2201/014* (2013.01); *C08L 2201/08* (2013.01); *C08L 2203/16* (2013.01); *C08L 2205/06* (2013.01)

(58) Field of Classification Search
CPC ....... B29C 41/003; B29C 41/12; B29C 41/42; B29C 41/50; B29K 2071/00; B29K 2083/00; B29K 2105/0032; B29K 2105/0038; B29K 2105/0044; C08G 65/336; C08J 2383/04; C08J 2471/02; C08J 5/18; C08K 13/06; C08K 2003/265; C08K 2201/005; C08K 2201/011; C08K 2201/014; C08K 3/013; C08K 3/26; C08K 3/34; C08K 3/36; C08K 5/12; C08K 5/20; C08K 9/02; C08L 2201/08; C08L 2203/16; C08L 2205/06; C08L 83/04

See application file for complete search history.

(56) References Cited

PUBLICATIONS

Amazon Product, "Dap 18354 Seal 'N Peel Removable Caulk, 10.1-Ounce", https://www.amazon.com/18354-Seal-Removable-Caulk-10-1-Ounce/dp/B001QFZS6E?th=1, last accessed Feb. 22, 2024.

Amazon Product, "Red Devil 0606 Zip-A-Way Removable Sealant, 1-Pack, Clear", https://www.amazon.com/Red-Devil-0606-Removable-10-1-Ounce/dp/B001EKHNRS/ref=pd_Ipo_1?pd_rd_i=B001EKHNRS&th=1, last accessed Feb. 22, 2024.

*Primary Examiner* — Lawrence D Ferguson
(74) *Attorney, Agent, or Firm* — Benesch Friedlander Coplan & Aronoff LLP

(57) ABSTRACT

A moisture barrier composition includes polymer resin 10 weight percent (wt. %) to 50 wt. %, plasticizer 10 wt. % to 50 wt. %, pigment 0.01 wt. % to 2 wt. %, liquid heat and UV stabilizer 0.01 wt. % to 2 wt. %, anti-settling agent 0.01 wt. % to 2 wt. % or thickening agent 0.5 wt. % to 5 wt. %, a first filler 5 wt. % to 50 wt. %, a second filler 5 wt. % to 50 wt. %, moisture scavenger 0.5 wt. % to 5 wt. %, and catalyst 0.01 wt. % to 2 wt.

20 Claims, No Drawings

REMOVABLE MOISTURE BARRIER

CROSS-REFERENCE TO RELATED APPLICATIONS

This application claims priority from U.S. Provisional application No. 63/385,802, filed on Dec. 2, 2022, which is incorporated by reference herein its entirety.

FIELD OF INVENTION

The present disclosure generally relates to compositions and methods for creating moisture barriers. More specifically, the present disclosure relates to compositions and methods for creating removeable moisture barriers that can be applied to surfaces using varying application methods and can be selectively removed as desired.

BACKGROUND

Waterproofing, and more broadly, moistureproofing is the process of making an object or structure moisture-resistant or water-resistant. For example, in the construction trade, moistureproofing a building is accomplished by forming an impermeable barrier on the surfaces of foundations, roofs, walls and/or other structural elements of the building to prevent the passage of moisture, such as water, through the surfaces of the building. Depending on the specific requirements of a building or other object and the environment around the building, a moisture barrier can be permanently applied to the building to provide long term protection, while in other instances, the moisture barrier can be temporarily attached to the building to protect against a one-time or periodic event, such as flooding, and removed once the threat is gone.

Disclosed herein are several novel compositions for use in forming a moisture barrier. Additionally, disclosed herein are methods of processing and forming such compounds into a barrier useful for moistureproofing structures and objects that provide certain advantages over conventional compositions and methods.

SUMMARY

Disclosed herein are various embodiments and examples of removable moisture barriers that are formed by selected polymer resin and curing agent chemistries. In one embodiment, selected combinations of polymer resin and curing agent chemistries are used to create a composition that can be applied to a surface in one step (i.e., a "one-part" composition) to form a moisture barrier. Such moisture barrier is arranged to provide robust protection against moisture damage to the surface and is further arranged to be selectively removed from the surface once the threat of moisture damage is gone. In other embodiments, selected combinations of polymer resin and curing agent chemistries are used to create a one-part composition that can be applied to a surface with a number of application methods such as brushing, rolling, caulking, troweling, and spraying to form a removeable moisture barrier on the surface. Regardless of the method of application, once the composition is applied to the surface, the removable moisture barrier protects the surface by against moisture damage, while the moisture barrier can be selectively removed when no longer needed or required.

DETAILED DESCRIPTION

The present disclosure is not limited in terms of the particular embodiments described in this application, which are intended as illustrations of various aspects only. Many modifications and variations can be made without departing from the scope of the invention, as will be apparent to those skilled in the art. Functionally equivalent methods within the scope of the disclosure, in addition to those enumerated herein, will be apparent to those skilled in the art from the following descriptions. Such modifications and variations are intended to fall within the scope of the appended claims. The terminology used herein is for the purpose of describing particular embodiments only and is not intended to be limiting.

The present disclosure generally relates to compositions and methods of creating removable moisture barriers on surfaces when applied to such surfaces. In particular, the compositions and methods of forming such compositions use selected combinations of polymer resin and curing agent chemistries to create a one-part high-performance selectively removable moisture barrier, which seals a surface to protect against moisture damage. As noted, the moisture barrier can be selectively removed as desired. The compositions disclosed herein can be used to form a removable moisture barrier to be brushed, rolled, caulked, troweled, or sprayed on a surface to coat, protect, or moisture proof the surface. The compositions disclosed herein can be applied in liquid form or in paste form (e.g., sealant/adhesive) to protect, moisture proof or create a gasket, coating, or seal where eventual removal of such moisture barrier is desired. The compositions disclosed herein can be applied to a surface on land or a surface that is submerged underwater. The compositions can be arranged so that compositions can be cured by exposure to water or other moisture.

Formulations of the Removable Moisture Barriers

The formulations of the removable moisture barriers disclosed herein include selected combinations of polymer resin and curing agent chemistries to create a one-part high-performance removable moistureproofing or sealing barrier where eventual removal of the barrier is desired. The selected combinations of polymer resin and curing agent chemistries are formulated to balance the goal of providing effective cross-linking to form adhesion with the surface while enabling the moisture barriers to be removed with minimal damage or residuals left on the surface.

The formulations of the removable moisture barriers disclosed herein may be formulated based on non-aqueous compositions. The formulations of the removable moisture barriers may be formulated with no or substantially free of volatile organic compounds. The formulations of the removable moisture barriers disclosed herein may be applied in the form of a liquid or paste.

The formulations disclosed herein may include a reactive telechelic silyl terminated polymer resin capable of curing which entails cross-linking by the hydrolysis of silyl ethers by moisture at room temperature.

The formulations disclosed herein may include a reactive telechelic polymer with a middle section containing a functionalized polyether backbone with methoxysilane terminal groups.

The formulations disclosed herein may include a reactive telechelic polymer with a middle section containing silylated polyurethane resin with a polydiorganosiloxane terminal groups or silylated polyurethane.

The formulations disclosed herein may include a reactive telechelic polymer containing an alpha-silane-terminated or a gamma-silane-terminated prepolymer containing low molecular weight polyether or polyester groups in the polymer backbone, and a silane-terminated polyether polymer containing polyether groups of higher molecular weight.

The formulations disclosed herein may include an organo-metal catalyst and/or a non-organo-metal catalyst.

The formulations disclosed herein may include a combination of fillers, rheology modifiers, plasticizers, and moisture scavengers to create a liquid or paste that is stable in can prior to use and can easily be applied with the method described above. The rheology modifiers may include fine calcium carbonate, fumed silica, micronized amide wax rheology modifier, or a combination thereof.

The formulations disclosed herein may include a combination of adhesive promoters and release agents that enable initial bond formation but subsequently enables the moisture barriers to be easily removed at the end of service life. The adhesive promoters and release agents may include silanes such as amino silanes and epoxy silanes. By controlling how the adhesive promoters and release agents are used, different levels of releasability are achieved. Different combinations of compounds in the formulations can affect the removability/releasability. The formulations may include a balanced combination of raw material(s), released agent(s), plasticizer(s), adhesion promotor(s), and/or polymer(s) to achieve desired removability/releasability.

Table 1 shows an example of Formulation I of the removable moisture barriers disclosed herein. Formulation I is formulated in liquid form.

TABLE 1

| Function | Weight Percentage (wt. %) |
|---|---|
| Polymer resin | 10-50 |
| Plasticizer | 10-50 |
| Pigment | 0.01-2 |
| Liquid heat & UV stabilizer | 0.01-2 |
| Anti-settling agent | 0.01-2 |
| First filler | 5-50 |
| Second filler | 5-50 |
| Moisture scavenger | 0.5-5 |
| Catalyst | 0.01-2 |

The polymer resin in Table 1 may be 10 wt. % to 50 wt. %, 10 wt. % to 40 wt. %, 10 wt. % to 30 wt. %, 15 wt. % to 25 wt. %, or 20 wt. %.

The polymer resin in Table 1 may include a reactive telechelic silyl terminated polymer resin capable of curing which entails cross-linking by the hydrolysis of silyl ethers by moisture at room temperature. The polymer resin in Table 1 may include a reactive telechelic polymer with a middle section containing a functionalized polyether backbone with methoxysilane terminal groups. The polymer resin in Table 1 may include a reactive telechelic polymer with a middle section containing silylated polyurethane resin with a polydiorganosiloxane terminal groups or silylated polyurethane. The polymer resin Table 1 may include a reactive telechelic polymer containing an alpha-silane-terminated or a gamma-silane-terminated prepolymer containing low molecular weight polyether or polyester groups in the polymer backbone, and a silane-terminated polyether polymer containing polyether groups of higher molecular weight.

The polymer resin in Table 1 may include silane terminated polyether, available from GENIOSIL®, KANEKA MS POLYMER™, SPUR+™ Prepolymers, or a combination thereof.

The plasticizer in Table 1 may be 10 wt. % to 50 wt. %, 10 wt. % to 40 wt. %, 10 wt. % to 30 wt. %, 20 wt. % to 30 wt. %, 25 wt. % to 30 wt. %, or 27 wt. %. The plasticizer in Table 1 may be selected from diisononyl phthalate, any suitable polyols, Poly-G 20-37 polyether diol available from Monument Chemical, Poly-G® 55-37 ethylene oxide-capped diol available from Monument Chemical, ARCOL® POLYOL PPG 2000 polyether polyol available from Covestro, plasticizers available from Exxon Mobil (for example, adipate plasticizer, DIDP plasticizer, DINP plasticizer, DIUP plasticizer, DTDP plasticizer, linear plasticizer, MB10 plasticizer, and trimellitate plasticizer).

The pigment in Table 1 may be 0.01 wt. % to 2.0 wt. %, 0.5 wt. % to 1.5 wt. %, 0.7 wt. % to 1.3 wt. %, or 1.0 wt. %. The pigment in Table 1 may include a pigment (e.g., yellow or any bright color pigment to make the applied product visible).

The liquid heat & UV stabilizer in Table 1 may be 0.01 wt. % to 2.0 wt. %, 0.01 wt. % to 1.0 wt. %, 0.01 wt. % to 0.5 wt. %, 0.01 wt. % to 0.4 wt. %, or 0.2 wt. %. The liquid heat & UV stabilizer in Table 1 may include Tinuvin B75 (Synergistic blend of 20% Irganox 1135+40% Tinuvin®571+40% Tinuvin®765).

The anti-settling agent in Table 1 may be 0.01 wt. % to 2.0 wt. %, 0.01 wt. % to 1.5 wt. %, 0.25 wt. % to 1.0 wt. %, 0.25 wt. % to 0.75 wt. % to 0.5 wt. %. The anti-settling agent in Table 1 may include hydrophilic pyrogenic silica.

The first filler and the second filler in Table 1 may be different chemical compounds. The first filler may be 5 wt. % to 50 wt. %, 5 wt. % to 40 wt. %, 5 wt. % to 30 wt. %, 5 wt. % to 20 wt. %, 5 wt. % to 10 wt. %, 6 wt. % to 8 wt. %, or 7 wt. %. The second filler may be 5 wt. % to 50 wt. %, 10 wt. % to 50 wt. %, 20 wt. % to 50 wt. %, 30 wt. % to 50 wt. %, 35 wt. % to 45 wt. %, or 40 wt. %. The first and second fillers in Table 1 may include coated limestone and calcium carbonate, respectively. A combination of the first and second fillers is balanced to obtain desired rheology and tensile properties. The first and second fillers may have different particle size distributions, for example, the first filler may have an average particle size around 3.5 microns and the second filler may have an average particle size around 9.5 microns.

The moisture scavenger in Table 1 may be 0.5 wt. % to 5 wt. %, 0.5 wt. % to 4 wt. %, 0.5 wt. % to 3 wt. %, 1.5 wt. % to 2.5 wt. %, or 2 wt. %. The moisture scavenger in Table 1 may include vinyltrimethoxysilane.

The catalyst in Table 1 may be 0.01 wt. to 2.0 wt. %, 0.01 wt. % to 1.0 wt. %, 0.01 wt. % to 0.08 wt. %, 0.02 wt. % to 0.06 wt. %, or 0.04 wt. %. The catalyst in Table 1 may serve as curing agent to catalyze crosslinking. The catalyst in Table 1 may include an organo-metal catalyst (organo-metallic compounds such as tin) and/or a non-organo-metal catalyst (amino silanes for example). The catalyst in Table 1 may include 1,1,3,3-Tetramethylguanidine.

In one example, Formulation I includes polymer resin that includes silane-terminated polyether of 20.7 wt. %, plasticizer that includes diisononyl phthalate of 27.65 wt. %, pigment that includes a pigment (e.g., yellow or any bright color pigment to make the applied product visible) of 0.98 wt. %, liquid heat and UV stabilizer that includes Tinuvin B75 of 0.2 wt. %, anti-settling agent that includes hydrophilic pyrogenic silica of 0.51 wt. %, first filler that includes coated limestone of 7.16 wt. %, second filler that includes calcium carbonate of 40.72 wt. %, moisture scavenger that includes vinyltrimethoxysilane of 2.04 wt. %, and catalyst that includes 1,1,3,3-Tetramethylguanidine of 0.042 wt. %.

Table 2 shows an example of Formulation II of the removable moisture barriers disclosed herein. Formulation II is formulated in paste form.

TABLE 2

| Function | Weight Percentage (wt. %) |
| --- | --- |
| Polymer resin | 10-50 |
| Plasticizer | 10-50 |
| Pigment | 0.01-2 |
| First filler | 5-50 |
| Second filler | 5-50 |
| Thickening agent | 0.5-5 |
| Liquid heat & UV stabilizer | 0.01-2 |
| Moisture scavenger | 0.5-5 |
| Catalyst | 0.01-2 |

The polymer resin in Table 2 may be 10 wt. % to 45 wt. %, 10 wt. % to 40 wt. %, 10 wt. % to 35 wt. %, 10 wt. % to 30 wt. %, 10 wt. % to 25 wt. %, 10 wt. % to 20 wt. %, or 20 wt. %.

The polymer resin in Table 2 may include a first polymer resin and a second polymer resin, and the first polymer resin and the second polymer resin are different chemical compounds. The first polymer resin may be 10 wt. % to 50 wt. %, 10 wt. % to 45 wt. %, 10 wt. % to 40 wt. %, 10 wt. % to 35 wt. %, 10 wt. % to 30 wt. %, 10 wt. % to 25 wt. %, 10 wt. % to 20 wt. %, or 15 wt. %. The second polymer resin may be 5 wt. % to 50 wt. %, 5 wt. % to 40 wt. %, 5 wt. % to 30 wt. %, 5 wt. % to 20 wt. %, 5 wt. % to 10 wt. %, or 5 wt. %.

The polymer resin in Table 2 may include a reactive telechelic silyl terminated polymer resin capable of curing which entails cross-linking by the hydrolysis of silyl ethers by moisture at room temperature. The polymer resin in Table 2 may include a reactive telechelic polymer with a middle section containing a functionalized polyether backbone with methoxysilane terminal groups. The polymer resin in Table 2 may include a reactive telechelic polymer with a middle section containing silylated polyurethane resin with a polydiorganosiloxane terminal groups or silylated polyurethane. The polymer resin Table 2 may include a reactive telechelic polymer containing an alpha-silane-terminated or a gamma-silane-terminated prepolymer containing low molecular weight polyether or polyester groups in the polymer backbone, and a silane-terminated polyether polymer containing polyether groups of higher molecular weight.

The polymer resin in Table 2 may include silane terminated polyether, available from GENIOSIL®, KANEKA MS POLYMER™, or SPUR+™ Prepolymers.

The plasticizer in Table 2 may be 10 wt. % to 50 wt. %, 10 wt. % to 45 wt. %, 10 wt. % to 40 wt. %, 10 wt. % to 35 wt. %, 10 wt. % to 30 wt. %, 10 wt. % to 25 wt. %, 10 wt. % to 20 wt. %, 15 wt. % to 20 wt. %, or 17 wt. %. The plasticizer in Table 2 may be selected from polyether polyol, any suitable polyols, Poly-G® 20-37 polyether diol available from Monument Chemical, Poly-G® 55-37 ethylene oxide-capped diol available from Monument Chemical, ARCOL® POLYOL PPG 2000 polyether polyol available from Covestro, plasticizers available from Exxon Mobil (for example, adipate plasticizer, DIDP plasticizer, DINP plasticizer, DIUP plasticizer, DTDP plasticizer, linear plasticizer, MB 10 plasticizer, and trimellitate plasticizer).

The pigment in Table 2 may be 0.01 wt. % to 2 wt. %, 0.5 wt. % to 1.8 wt. %, 0.5 wt. % to 1.5 wt. %, or 1.0 wt. %. The pigment in Table 2 may include a pigment (e.g., yellow or any bright color pigment to make the applied product visible).

The first filler and the second filler in Table 2 may be different chemical compounds. The first filler may be 5 wt. % to 50 wt. %, 5 wt. % to 40 wt. %, 5 wt. % to 30 wt. %, 5 wt. % to 20 wt. %, 10 wt. % to 15 wt. %, or 13 wt. %. The second filler may be 5 wt. % to 50 wt. %, 10 wt. % to 50 wt. %, 20 wt. % to 50 wt. %, 30 wt. % to 50 wt. %, 35 wt. % to 45 wt. %, or 40 wt. %. The first and second fillers in Table 2 may include precipitated calcium carbonate and calcium carbonate, respectively. The first and second fillers may have different particle size distributions.

The thickening agent in Table 2 may be 0.5 wt. % to 5 wt. %, 0.5 wt. % to 4 wt. %, 1 wt. % to 4 wt. %, 2 wt. % to 3 wt. %, 2.5 wt. %, 2.7 wt. %, or 2.8 wt. %. The thickening agent in Table 2 may include bisamide mixture.

The liquid heat & UV stabilizer in Table 2 may be 0.01 wt. % to 2 wt. %, 0.01 wt. % to 1.5 wt. %, 0.01 wt. % to 1.0 wt. %, 0.25 wt. % to 0.75 wt. %, or 0.5 wt. %. The liquid heat & UV stabilizer in Table 2 may include Tinuvin B75 (Synergistic blend of 20% Irganox 1135+40% Tinuvin®571+40% Tinuvin®765).

The moisture scavenger in Table 2 may be 0.5 wt. % to 5 wt. %, 1.0 wt. % to 4.5 wt. %, 1.5 wt. % to 4.0 wt. %, 2 wt. % to 3.5 wt. %, or 3.0 wt. %. The moisture scavenger in Table 2 may include vinyltrimethoxysilane.

The catalyst in Table 2 may be 0.01 wt. % to 2.0 wt. %, 0.01 wt. % to 1.0 wt. %, 0.2 wt. % to 0.6 wt. %, 0.4 wt. % to 0.5 wt. %, or 0.45 wt. %. The catalyst in Table 2 may serve as curing agent to catalyze crosslinking. The catalyst in Table 2 may include an organo-metal catalyst (organo-metallic compounds such as tin) and/or a non-organo-metal catalyst (amino silanes for example). The catalyst in Table 2 may include dibutyltin oxide.

In one example, Formulation 2 includes polymer resin that includes a first silane-terminated polyether of 15.41 wt. % and a second silane-terminated polyether of 5.14 wt. % (the first and second silane-terminated polyethers may be selected from GENIOSIL, KANEKA MS POLYMER™, SPUR+™ Prepolymers, or a combination thereof), plasticizer that includes polyether polyol of 17.26 wt. %, pigment that includes a pigment (e.g., yellow or any bright color pigment to make the applied product visible) of 0.92 wt. %, a first filler that includes precipitated calcium carbonate of 13.35 wt. %, a second filler that includes calcium carbonate of 41.09 wt. %, a thickening agent that includes bisamide mixture of 2.77 wt. %, liquid heat and UV stabilizer that includes Tinuvin B75 of 0.51 wt. %, moisture scavenger that includes vinyltrimethoxysilane of 3.08 wt. %, and catalyst that includes dibutyltin oxide of 0.46 wt. %. A combination of the first and second fillers is balanced to obtain desired rheology and tensile properties. The first and second fillers may have different particle size distributions, for example, the first filler may have an average particle size around 0.07 microns and the second filler may have an average particle size around 9.5 microns. A combination of the two kinds of polymer resins (e.g., the first silane-terminated polyether and the second silane-terminated polyether) is balanced to obtain desired properties.

Both of Formulations I and II contain no solvent, no water, and no volatile organic compounds.

The polymer resin disclosed herein may be a silane-terminated polyether. A silane-terminated polyether polymer may be a reactive telechelic silyl terminated polymer resin capable of curing which entails cross-linking by the hydrolysis of silyl ethers by moisture at room temperature. A silane-terminated polyether polymer may be a reactive telechelic polymer with a middle section that contains a functionalized polyether backbone with methoxysilane terminal groups. A silane-terminated polyether polymer may be a reactive telechelic polymer with a middle section that contains silylated polyurethane resin with a polydiorganosiloxane terminal groups or silylated polyurethane. A silane-terminated polyether polymer may be a reactive telechelic polymer containing an alpha-silane-terminated or a gamma-silane-terminated prepolymer containing low molecular weight polyether or polyester groups in the polymer backbone. A silane-terminated polyether polymer may contain polyether groups of higher molecular weight. The silane terminated polyether may offer unique advantages including: the removable moisture barriers are not washed off easily with water (immediately rain resistant), the removable moisture barriers may be cured underwater, the removable moisture barriers include high solid content, and the removable moisture barriers are elastomeric.

The catalysts disclosed herein are formulated for the formulations to form moisture cure product that reacts with moisture in the atmosphere to cure. The catalysts may include an organo-metal catalyst and/or a non-organo-metal catalyst.

The fillers disclosed herein may include coated limestone, calcium carbonate, precipitated calcium carbonate, or a combination thereof.

The plasticizers disclosed herein may include diisononyl phthalate, polyether polyol, or a combination thereof.

The moisture scavengers disclosed herein are formulated to chemically dry the formulations. The moisture scavengers may include vinyltrimethoxysilane.

Methods of Preparing and Applying Removable Moisture Barriers

The formulations disclosed herein can be mixed in a mixer, e.g., a planetary mixer, under vacuum. The mixed formulations can be applied (e.g., coated, brushed, rolled, caulked, troweled, or sprayed) to a surface or substrate. The mixed formulations can be cured (e.g., by exposure to moisture and/or water) in the atmosphere or under water to form a moisture barrier on the surface or substrate.

As an example, the moisture barriers disclosed herein may be used for flood protection. The formulations of the moisture barriers disclosed herein are applied to surfaces to be protected (e.g., surfaces, walls, windows, etc. of a building). The applied formulations can be left in the atmosphere and/or under water to be cured and form moisture barriers. If desired (e.g., when the weather condition permits, when the water/flood recedes, etc.), the moisture barriers can be removed with minimal damage or trace left on the surfaces.

Test Results

Table 3 shows test results of Formulations I and II.

TABLE 3

|  | Formulation I | Formulation II |
| --- | --- | --- |
| Viscosity (centipoise, cps) | 20,000-100,000 | 1,100,000-2,500,000 |
| Skin time | 40-120 minutes | 30-120 minutes |

Formulations I and II are formulated to pass stability tests to ensure sufficient shelf-life.

Tests (peel tests, ASTM C-794 for example) are performed on Formulations I and II to evaluate the adhesion performance. Based on the tests results Formulations I and II show good removability on a variety of surfaces (e.g., aluminum, glass, concrete, painted concrete, untreated wood, painted untreated wood, treated wood, vinyl siding, PVC with rubber mat, etc.) in both dry and wet surface conditions. Formulations I and II are formulated to have effective adhesion to the applied surface and removable from the applied surface with minimal damage or trace left on the applied surface. Formulations I and II are formulated to be removable from the applied surface by hand.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

The invention claimed is:

1. A moisture barrier composition, comprising:
polymer resin 10 weight percent (wt. %) to 50 wt. %;
plasticizer 10 wt. % to 50 wt. %;
pigment 0.01 wt. % to 2 wt. %;
liquid heat and UV stabilizer 0.01 wt. % to 2 wt. %;
anti-settling agent 0.01 wt. % to 2 wt. % or thickening agent 0.5 wt. % to 5 wt. %;
a first filler 5 wt. % to 50 wt. %;
a second filler 5 wt. % to 50 wt. %;
moisture scavenger 0.5 wt. % to 5 wt. %; and
catalyst 0.01 wt. % to 2 wt. %.

2. The moisture barrier composition of claim 1 comprises the anti-settling agent 0.01 wt. % to 2 wt. % and is in liquid form.

3. The moisture barrier composition of claim 1 comprises the thickening agent 0.5 wt. % to 5 wt. % and is in paste form.

4. The moisture barrier composition of claim 1 is free of volatile organic compounds.

5. The moisture barrier composition of claim 1 is cured by exposure to moisture or water.

6. The moisture barrier composition of claim 5, wherein the cured moisture barrier composition is removable from an applied surface with minimal damage or trace left on the applied surface.

7. The moisture barrier composition of claim 1, wherein the polymer resin comprises a reactive telechelic polymer containing an alpha-silane-terminated or a gamma-silane-terminated prepolymer.

8. The moisture barrier composition of claim 1, wherein the plasticizer comprises diisononyl phthalate and/or polyether polyol.

9. The moisture barrier composition of claim 1, wherein the pigment comprises yellow or a bright color pigment.

10. The moisture barrier composition of claim 1, wherein the anti-settling agent comprises hydrophilic pyrogenic silica.

11. The moisture barrier composition of claim 1, wherein the thickening agent comprises a bisamide mixture.

12. The moisture barrier composition of claim 1, wherein the first filler and the second filler comprise coated limestone and calcium carbonate.

13. The moisture barrier composition of claim 1, wherein the first filler has an average particle size about 0.07 microns.

14. The moisture barrier composition of claim 1, wherein the first filler has an average particle size about 3.5 microns and the second filler has an average particle size about 9.5 microns.

15. The moisture barrier composition of claim 1, wherein the first filler has an average particle size about 0.07 microns and the second filler has an average particle size about 9.5 microns.

16. The moisture barrier composition of claim 1, wherein the moisture scavenger comprises vinyltrimethoxysilane and the catalyst comprises an organo-metal catalyst and/or a non-organo-metal catalyst.

17. A moisture barrier formed by a process, the process comprising:
   applying a moisture barrier composition to a surface, wherein the moisture barrier composition comprises:
   polymer resin 10 weight percent (wt. %) to 50 wt. %;
   plasticizer 10 wt. % to 50 wt. %;
   pigment 0.01 wt. % to 2 wt. %;
   liquid heat and UV stabilizer 0.01 wt. % to 2 wt. %;
   anti-settling agent 0.01 wt. % to 2 wt. % or thickening agent 0.5 wt. % to 5 wt. %;
   a first filler 5 wt. % to 50 wt. %;
   a second filler 5 wt. % to 50 wt. %;
   moisture scavenger 0.5 wt. % to 5 wt. %; and
   catalyst 0.01 wt. % to 2 wt. %; and
   curing the applied moisture barrier composition by exposing it to moisture.

18. A moisture barrier of claim 17, wherein curing the applied moisture barrier composition comprises applying the moisture barrier composition to the surface under water.

19. A method of using a moisture barrier comprising:
   applying a moisture barrier composition to a surface, wherein the moisture barrier composition comprises:
   polymer resin 10 weight percent (wt. %) to 50 wt. %;
   plasticizer 10 wt. % to 50 wt. %;
   pigment 0.01 wt. % to 2 wt. %;
   liquid heat and UV stabilizer 0.01 wt. % to 2 wt. %;
   anti-settling agent 0.01 wt. % to 2 wt. % or thickening agent 0.5 wt. % to 5 wt. %;
   a first filler 5 wt. % to 50 wt. %;
   a second filler 5 wt. % to 50 wt. %;
   moisture scavenger 0.5 wt. % to 5 wt. %; and
   catalyst 0.01 wt. % to 2 wt. %; and
   curing the applied moisture barrier composition by exposing it to moisture.

20. The method of claim 19, comprising removing the cured moisture barrier from the surface.

* * * * *